(12) United States Patent
Xiong et al.

(10) Patent No.: US 11,328,133 B2
(45) Date of Patent: May 10, 2022

(54) TRANSLATION PROCESSING METHOD, TRANSLATION PROCESSING DEVICE, AND DEVICE

(71) Applicant: BEIJING BAIDU NETCOM SCIENCE AND TECHNOLOGY CO., LTD., Beijing (CN)

(72) Inventors: Hao Xiong, Beijing (CN); Zhongjun He, Beijing (CN); Xiaoguang Hu, Beijing (CN); Hua Wu, Beijing (CN); Zhi Li, Beijing (CN); Zhou Xin, Beijing (CN); Tian Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 118 days.

(21) Appl. No.: 16/585,269

(22) Filed: Sep. 27, 2019

(65) Prior Publication Data
US 2020/0104372 A1 Apr. 2, 2020

(30) Foreign Application Priority Data
Sep. 28, 2018 (CN) .......................... 201811142935.8

(51) Int. Cl.
*G06F 40/58* (2020.01)
*G06N 20/00* (2019.01)
(Continued)

(52) U.S. Cl.
CPC ............. *G06F 40/58* (2020.01); *G06N 20/00* (2019.01); *G10L 13/00* (2013.01); *G10L 15/22* (2013.01); *G10L 15/26* (2013.01); *G10L 25/24* (2013.01)

(58) Field of Classification Search
CPC .......... G06F 40/58; G06F 40/51; G06F 40/42; G06F 40/47; G10L 15/26; G10L 13/00;
(Continued)

(56) References Cited

U.S. PATENT DOCUMENTS

| 6,122,614 A | 9/2000 | Kahn et al. |
| 2009/0198493 A1 | 8/2009 | Hakkani-Tur et al. |

(Continued)

FOREIGN PATENT DOCUMENTS

| CN | 106023985 A | 10/2016 |
| CN | 107170453 A | 9/2017 |

(Continued)

OTHER PUBLICATIONS

Office Action for Chinese Application No. 201811142935.8, dated May 22, 2020, 30 pages.

*Primary Examiner* — Angela A Armstrong
(74) *Attorney, Agent, or Firm* — Fay Sharpe LLP (57) ABSTRACT

The present disclosure provides a translation processing method, a translation processing device, and a device. The first speech signal of the first language is obtained, and the speech feature vector of the first speech signal is extracted based on the preset algorithm. Further, the speech feature vector is input into the pre-trained end-to-end translation model for conversion from the first language speech to the second language text for processing, and the text information of the second language corresponding to the first speech signal is obtained. Moreover, speech synthesis is performed on the text information of the second language, and the corresponding second speech signal is obtained and played.

12 Claims, 4 Drawing Sheets

(51) Int. Cl.
*G10L 15/22* (2006.01)
*G10L 25/24* (2013.01)
*G10L 13/00* (2006.01)
*G10L 15/26* (2006.01)

(58) Field of Classification Search
CPC ....... G10L 15/22; G10L 15/02; G10L 15/063; G10L 15/10; G10L 25/24; G06N 20/00
See application file for complete search history.

(56) References Cited

U.S. PATENT DOCUMENTS

| 2011/0307241 | A1* | 12/2011 | Waibel | G10L 15/06 |
| | | | | 704/2 |
| 2012/0109626 | A1* | 5/2012 | Yassa | G06F 40/51 |
| | | | | 704/2 |
| 2014/0303957 | A1* | 10/2014 | Lee | G06F 40/58 |
| | | | | 704/2 |
| 2018/0336900 | A1* | 11/2018 | Zou | G10L 15/22 |
| 2019/0065478 | A1* | 2/2019 | Tsujikawa | G06F 3/167 |

FOREIGN PATENT DOCUMENTS

| CN | 108319591 A | 7/2018 |
| CN | 108447486 A | 8/2018 |

* cited by examiner

FIG. 3 a speech corpus of the first language and a corresponding text corpus of the second language are obtained as a translation training corpus — 301 a processing parameter of a preset model is trained based on the translation training corpus, to generate the end-to-end translation model — 302

TRANSLATION PROCESSING METHOD, TRANSLATION PROCESSING DEVICE, AND DEVICE

CROSS-REFERENCE TO RELATED APPLICATIONS

This application claims priority to and benefits of Chinese Patent Application No. 201811142935.8, filed with the National Intellectual Property Administration of P. R. China on Sep. 28, 2018, the entire contents of which are incorporated herein by reference.

TECHNICAL FIELD

The present disclosure relates to the field of speech translation, and more particularly, to a translation processing method, a translation processing device, and a device.

BACKGROUND

Currently, in the case of language barriers, users would like to convert a language into another language to achieve cross-language communication. Speech translation is common in scenes such as traveling abroad and communication among people of different languages, and user's needs can be met in this respect.

However, in the process of speech recognition, inaccurate recognition may occur. For example, a message that the speaker wants to express is "is there a hot dog sold nearby", by speech recognition, the message may be misrecognized as "is there a mango sold nearby", and the incorrect recognized message is translated, such that it is difficult to achieve correct semantic feedback, and the accuracy of the speech translation needs to be improved.

SUMMARY

Embodiments of the present disclosure provide a translation processing method, including: obtaining a first speech signal of a first language, and extracting a speech feature vector of the first speech signal based on a preset algorithm; inputting the speech feature vector into a pre-trained end-to-end translation model for conversion from a first language speech to a second language text, to obtain text information of a second language corresponding to the first speech signal; and performing speech synthesis on the text information of the second language to obtain a second speech signal, and playing the second speech signal.

Embodiments of the present disclosure provide a computer device. The computer device includes a processor and a memory. The processor is configured to run a program corresponding to executable program codes by reading the executable program codes stored in the memory, to perform the translation processing method according to embodiments of the first aspect of the present disclosure.

Embodiments of the present disclosure provide a non-transitory computer readable storage medium having stored thereon a computer program that, when executed by a processor, causes the translation processing method according to embodiments of the first aspect of the present disclosure to be implemented.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements Embodiments described herein with reference to drawings are explanatory, serve to explain the present disclosure, and are not construed to limit embodiments of the present disclosure.

In the related art, speech recognition is generally performed on speaker's speech to obtain speech content, the recognized speech content is converted into characters, the characters are translated into characters in a target language by a translation engine, and then the speech of the target language is generated by speech synthesis technology.

The translation processing method, translation processing device, and device according to embodiments of the present disclosure will be described below with reference to the accompanying drawings.

Figure 1:
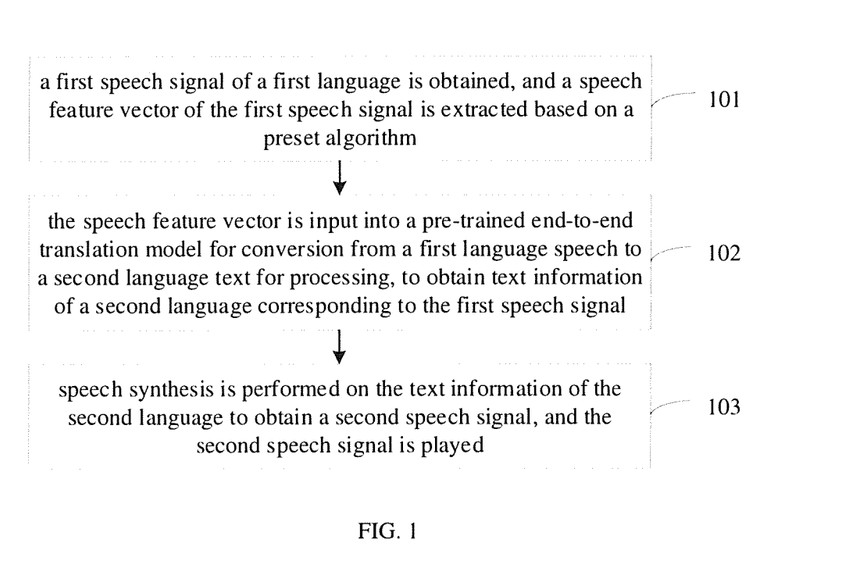
FIG. 1 is a flow chart of a translation processing method according to an embodiment of the present disclosure.

FIG. 1 is a flow chart of a translation processing method according to an embodiment of the present disclosure. As shown in FIG. 1, the method may include the followings.

At block 101, a first speech signal of a first language is obtained, and a speech feature vector of the first speech signal is extracted based on a preset algorithm.

In an embodiment, when speech translation is performed, the first speech signal of the first language may be obtained first. For example, the first speech signal may be obtained by a speech receiving device such as a microphone.

The first language may be any language, such as Chinese, English, Russian, and the like.

In an embodiment of the present disclosure, the first speech signal may be subjected to a Mel-frequency cepstrum analysis to generate the speech feature vector.

The speech feature may include, but is not limited to, sound intensity, pitch, loudness, cepstral coefficient, energy, formant, and the like. The preset algorithm may include, but is not limited to, Mel-frequency cepstrum analysis, linear predictive analysis, linear predictive cepstral coefficients, and the like.

At block 102, the speech feature vector is input into a pre-trained end-to-end translation model for conversion from a first language speech to a second language text for processing, to obtain text information of a second language corresponding to the first speech signal.

In an embodiment of the present disclosure, a speech corpus of the first language and a corresponding text corpus of the second language may be obtained as a translation training corpus, the processing parameter of a preset model may be trained based on the translation training corpus to generate the end-to-end translation model. Further, the speech feature vector of the first speech signal is input into the pre-trained end-to-end translation model for processing, thereby obtaining the corresponding text information of the second language.

For example, in the process of Chinese-English speech translation, the Chinese speech corpus and the corresponding English text corpus may be obtained as the translation training corpus. For example, the Chinese speech "你好 (Chinese characters, meaning hello)" and the English text "hello" may be obtained as the translation training corpus, and the processing parameter of the preset model may be trained to generate the end-to-end translation model. Furthermore, when speech translation is performed on the Chinese speech "你好", the speech feature vector of "你好" may be extracted and input into the pre-trained end-to-end translation model, to obtain the English text "hello".

The second language may be any language different from the first language. The end-to-end translation model may include, but is not limited to, a recurrent neural network (RNN), a transformer model, and the like.

At block 103, speech synthesis is performed on the text information of the second language to obtain a second speech signal, and the second speech signal is played.

In an embodiment of the present disclosure, the text information of the second language may be synthesized by speech synthesis technology (such as text to speech conversion), thereby generating the corresponding second speech signal of the second language, and playing it. For example, the English text "hello" may be synthesized to generate English speech "hello", and the English speech "hello" can be played through a device such as a microphone.

In an embodiment of the present disclosure, an audio file of speech information corresponding to the text information may be recorded in advance, and correspondence between the text information and the speech information may be pre-stored in the database. After the text information is obtained, by querying the database, the corresponding audio file of the speech information may be obtained and played. For example, after the English text "hello" is obtained, by querying the database, the audio file of the English speech "hello" may be obtained and played.

In the embodiment, the speech feature vector of the speech signal of the first language is input into the end-to-end translation model, the speech of the first language is directly converted into the text of the second language, such that the error caused in the speech recognition step will not be transmitted to the translation step, and the accuracy of speech translation can be improved. Moreover, an automated speech translation solution is provided relative to the method of human translation, the cost can be reduced.

In summary, with the translation processing method according to embodiments of the present disclosure, the first speech signal of the first language is obtained, and the speech feature vector of the first speech signal is extracted based on the preset algorithm. Further, the speech feature vector is input into the pre-trained end-to-end translation model for conversion from the first language speech to the second language text for processing, and the text information of the second language corresponding to the first speech signal is obtained. Moreover, speech synthesis is performed on the text information of the second language, and the corresponding second speech signal is obtained and played. Thereby, the speech of the first language is directly converted into the text of the second language, such that the error caused in the speech recognition step will not be transmitted to the translation step, and the accuracy of speech translation can be improved.

In order to explain the present disclosure more clearly, the process of extracting the speech feature vector of the first speech signal may be explained by taking a transformer model as an example.

Figure 2:
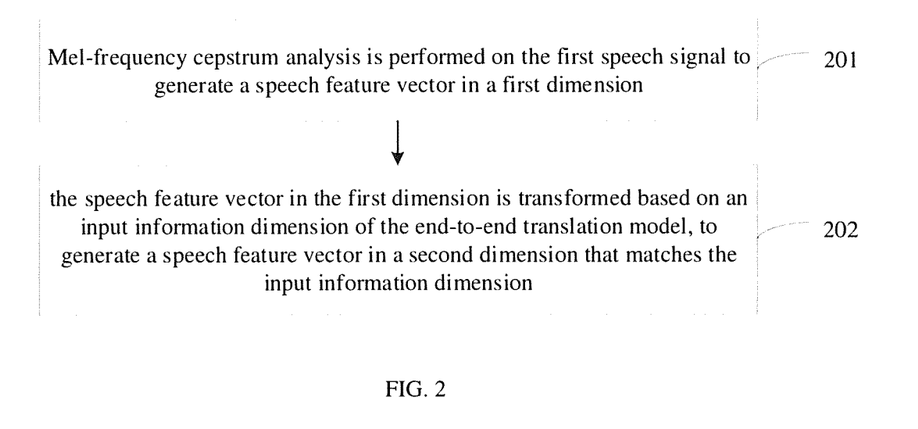
FIG. 2 is a flow chart of a translation processing method according to another embodiment of the present disclosure.

FIG. 2 is a flow chart of a translation processing method according to another embodiment of the present disclosure. As shown in FIG. 2, after the first speech signal of the first language is obtained, the method may further include the followings.

At block 201, Mel-frequency cepstrum analysis is performed on the first speech signal to generate a speech feature vector in a first dimension.

In the embodiment, Mel-frequency cepstrum analysis may be performed on the first speech signal to generate the speech feature vector. For example, processing such as pre-emphasis, framing, windowing, fast Fourier transformation (FFT), Mel filter bank, logarithm, discrete cosine transform (DCT) may be performed on the first speech signal, and the speech signal feature may be extracted by Mel-frequency cepstrum analysis, the speech feature vector can be generated. For example, a speech feature vector with a sequence dimension of 80 can be generated.

At block 202, the speech feature vector in the first dimension is transformed based on an input information dimension of the end-to-end translation model, to generate a speech feature vector in a second dimension that matches the input information dimension.

In an embodiment of the present disclosure, the speech feature vector in the first dimension may be transformed by using a feed forward neural network, to generate the speech feature vector in the second dimension.

Figure 3:
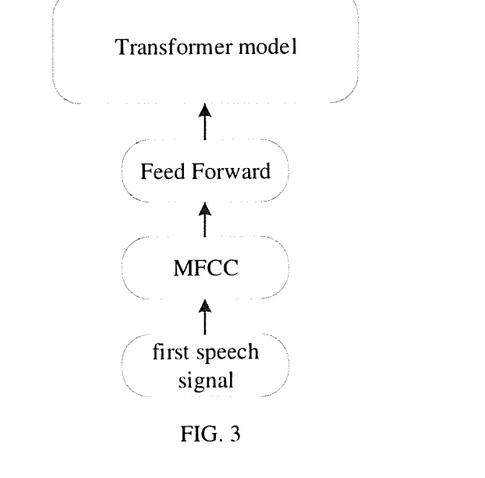
FIG. 3 is a schematic diagram of an end-to-end translation model according to an embodiment of the present disclosure.

For example, taking an input layer of the transformer model as an example, referring to FIG. 3, the input information dimension of a standard transformer model is generally 1024. Therefore, after Mel-frequency cepstrum analysis is performed on the first speech signal to generate the 80-dimensional speech feature vector, the speech feature may be uniformly mapped to 1024 dimensions by the feed forward network. Then, the 1024-dimensional speech feature vector can be input into the standard transformer model for processing, so as to generate corresponding text information of the second language.

It can be understood that, the standard transformer model, in the Mel-frequency cepstral coefficient (MFCC) and feed forward sections shown in FIG. 3, is an input embedding module for inputting text. In the embodiment, the speech signal is processed in the source end, thus Mel-frequency cepstrum analysis needs to be performed on the speech signal to generate the speech feature vector, and the dimension of the speech feature vector is converted to generate the speech feature vector in the second dimension that matches the input information dimension, such that the speech feature vector can be processed by the transformer model.

It should be noted that, in the embodiment of the present disclosure, text information is input in a target end of the end-to-end translation model, the target end may be designed using the text information input embedding used by the standard transformer model.

With the translation processing method according to embodiments of the present disclosure, the speech of the first language is directly converted into the text of the second language by the end-to-end translation model, such that the error caused in the speech recognition step will not be transmitted to the translation step, and the accuracy of speech translation can be improved. Moreover, by optimizing the model, the end-to-end translation model is applied to the speech-text translation, system performance and product usability can be improved.

Based on the above embodiments, before the speech feature vector is input into the end-to-end translation model for processing, the translation training corpus may be obtained to train the end-to-end translation model.

Figure 4:
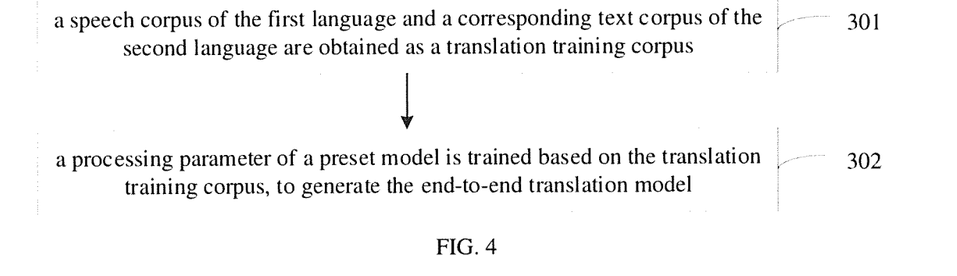
FIG. 4 is a flow chart of a translation processing method according to another embodiment of the present disclosure.

FIG. 4 is a flow chart of a translation processing method according to another embodiment of the present disclosure. As shown in FIG. 4, the method may include followings.

At block 301, a speech corpus of the first language and a corresponding text corpus of the second language are obtained as a translation training corpus.

Figure 5:
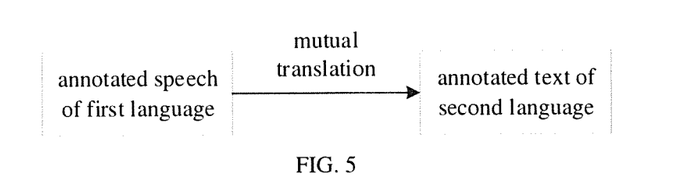
FIG. 5 is a schematic diagram of obtaining a translation training corpus according to an embodiment of the present disclosure.

In an embodiment of the present disclosure, as shown in FIG. 5, the annotated speech corpus of the first language can be obtained, and the corresponding annotated text corpus of the second language can be obtained, such that the translation training corpus can be generated. For example, the speech "你好" and the text "hello" may be manually annotated to generate the translation training corpus. For example, considering free translation or cultural differences between different languages, the speech of the first language and the corresponding freely translated text of the second language may be manually to generate the translation training corpus, such as "孤岛惊魂 (Chinese characters, meaning far cry)" and "far cry", or proverbs.

Figure 6:
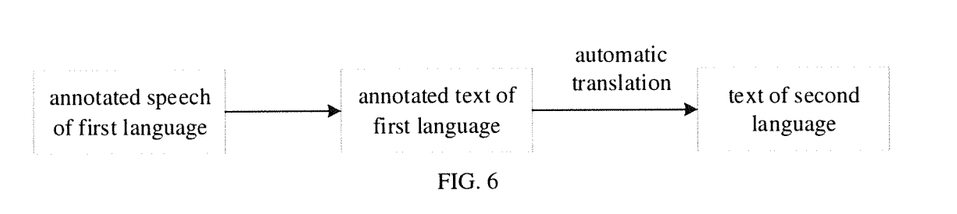
FIG. 6 is a schematic diagram of obtaining a translation training corpus according to another embodiment of the present disclosure.

In an embodiment of the present disclosure, as shown in FIG. 6, the annotated text corpus of the first language corresponding to the speech corpus of the first language may be obtained, and the text corpus of the first language may be translated into the text corpus of the second language by a translation engine. For example, the speech "你好" and the text "hello" may be manually annotated, and by a translation engine, a text "你好" may be translated into the text "hello", so as to generate the translation training corpus for the speech "你好" and the text "hello". Thereby, the cost of acquiring the translation training corpus can be reduced, and the efficiency can be improved.

In an embodiment of the present disclosure, after the translation training corpus for minority languages is obtained, the speech corpus of the first language may be recognized by a speech recognition system to obtain the text corpus of the first language, and the text corpus of the first language is then translated into the text corpus of the second language by the translation engine. Therefore, it is convenient to construct the translation training corpus for minority languages, and the performance of the translation model for minority languages can be improved.

It should be noted that, the implementation manner for obtaining the translation training corpus is merely exemplary, and the translation training corpus may be obtained in any one of the manners, or in combination of a plurality of manners, which is not limited herein.

At block 302, a processing parameter of a preset model is trained based on the translation training corpus, to generate the end-to-end translation model.

In the embodiment, the translation training corpus such as the speech corpus of the first language and the corresponding text corpus of the second language is obtained, the processing parameters of the preset model can be trained based on the translation training corpus, and the end-to-end translation model can be generated. Furthermore, by acquiring the speech feature vector of the speech signal of the first language, and inputting it into the end-to-end translation model for processing, the corresponding text information of the second language can be acquired, and the text information of the second language can be synthesized into the speech information and played, thereby realizing the speech translation.

The end-to-end translation model may include, but is not limited to, a recurrent neural network (RNN), a transformer model, and the like.

With the translation processing method according to embodiments of the present disclosure, by obtaining the speech corpus of the first language and the corresponding text corpus of the second language as the translation training corpus, the end-to-end translation model is trained. Further, the speech of the first language is directly converted into the text of the second language by the end-to-end translation model, such that the accuracy of speech translation can be improved.

In order to implement the above embodiments, the present disclosure further provides a translation processing device.

Figure 7:
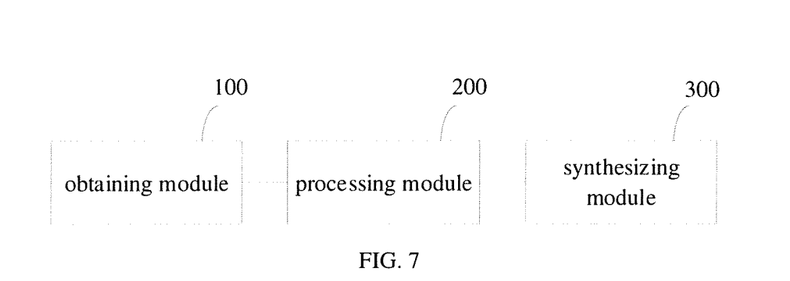
FIG. 7 is a block diagram of a translation processing device according to an embodiment of the present disclosure.

FIG. 7 is a block diagram of a translation processing device according to an embodiment of the present disclosure, as shown in FIG. 7, the device includes an obtaining module 100, a processing module 200, and a synthesizing module 300.

The obtaining module 100 is configured to obtain a first speech signal of a first language, and extract a speech feature vector of the first speech signal based on a preset algorithm. The processing module 200 is configured to input the speech feature vector into a pre-trained end-to-end translation model for conversion from a first language speech to a second language text to obtain text information of a second language corresponding to the first speech signal. The synthesizing module 300 is configured to perform speech synthesis on the text information of the second language to obtain a second speech signal, and play the second speech signal.

In at least one embodiment, the obtaining module 100 is configured to: perform Mel-frequency cepstrum analysis on the first speech signal to generate a speech feature vector in a first dimension; and transform the speech feature vector in the first dimension based on an input information dimension of the end-to-end translation model to generate a speech feature vector in a second dimension that matches the input information dimension.

Figure 8:
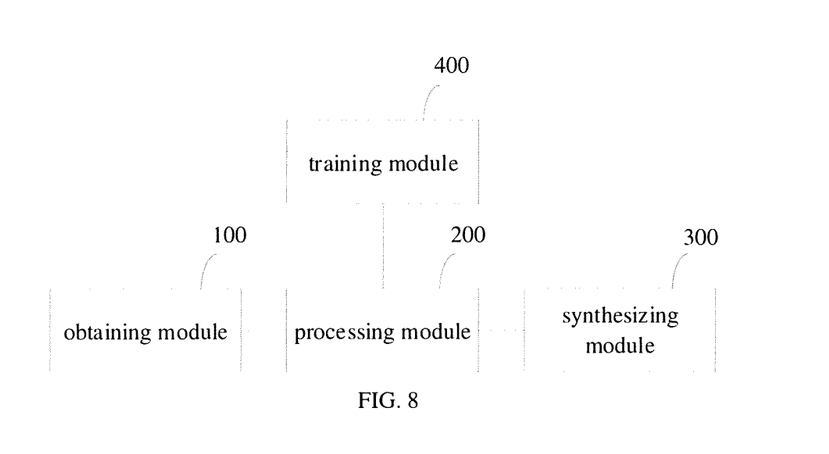
FIG. 8 is a block diagram of a translation processing device according to another embodiment of the present disclosure.

FIG. 8 is a block diagram of a translation processing device according to another embodiment of the present disclosure, on the basis of FIG. 7, the device shown in FIG. 8 further includes a training module 400. The training module 400 is configured to obtain a speech corpus of the first language and a corresponding text corpus of the second language as a translation training corpus, and train a processing parameter of a preset model based on the translation training corpus to generate the end-to-end translation model.

In at least one embodiment, when the first language and the second language are minority languages, the training module 400 is configured to: perform a recognition process on the speech corpus of the first language by a speech recognition system to obtain a text corpus of the first language; and translate the text corpus of the first language into the text corpus of the second language by a translation engine.

In at least one embodiment, the training module 400 is further configured to: obtain annotated text corpus of the first language corresponding to the speech corpus of the first language; and translate the text corpus of the first language into the text corpus of the second language by a translation engine.

It should be noted that, the explanation of the translation processing method in the foregoing embodiment may also be applicable to the translation processing device of the embodiment, and details are not described herein again.

With the translation processing device according to embodiments of the present disclosure, the first speech signal of the first language is obtained, and the speech feature vector of the first speech signal is extracted based on the preset algorithm. Further, the speech feature vector is input into the pre-trained end-to-end translation model for conversion from the first language speech to the second language text for processing, and the text information of the second language corresponding to the first speech signal is obtained. Moreover, speech synthesis is performed on the text information of the second language, and the corresponding second speech signal is obtained and played. Thereby, the speech of the first language is directly converted into the text of the second language, such that the error caused in the speech recognition step will not be transmitted to the translation step, and the accuracy of speech translation can be improved.

In order to implement the above embodiments, the present disclosure further provides a computer device including a processor and a memory. The processor is configured to run a program corresponding to executable program codes by reading the executable program codes stored in the memory, to perform the translation processing method according to any embodiment of the present disclosure.

In order to implement the above embodiments, the present disclosure provides a computer program product having stored thereon an instruction that, when executed by a processor, causes the translation processing method according to any embodiment of the present disclosure to be implemented.

In order to implement the above embodiments, the present disclosure further provides a non-transitory computer readable storage medium having stored thereon a computer program that, when executed by a processor, causes the translation processing method according to any embodiment of the present disclosure to be implemented.

Figure 9:
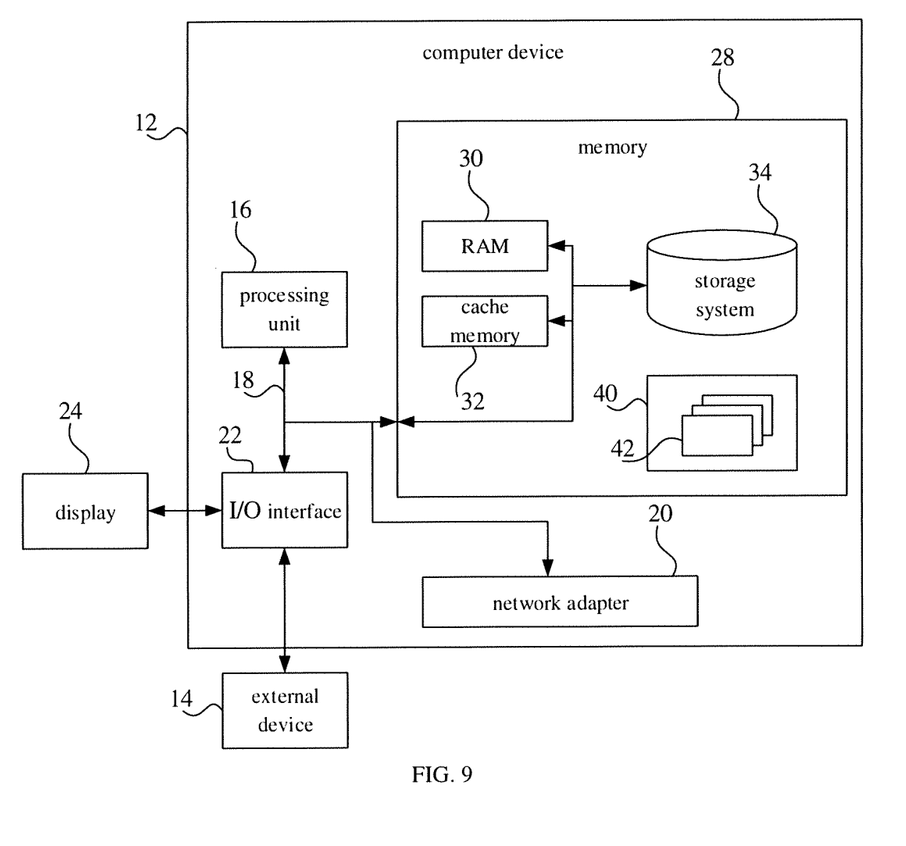
FIG. 9 is a block diagram of an exemplary computer device suitable for implementing an embodiment of the present disclosure.

FIG. 9 illustrates a block diagram of an exemplary computer device suitable for implementing embodiments of the present disclosure. The computer device 12 shown in FIG. 9 is merely an example, and should not impose any limitation on the function and scope of embodiments of the present disclosure.

As illustrated in FIG. 9, the computer device 12 is in the form of a general-purpose computing apparatus. The computer device 12 may include, but is not limited to, one or more processors or a processing unit 16, a system memory 28, and a bus 18 connecting different system components (including the system memory 28 and the processing unit 16).

The bus 18 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12, including volatile and non-volatile media, removable and non-removable media.

The system memory 28 may include a computer system readable medium in the form of volatile memory, such as a random-access memory (hereinafter referred to as RAM) 30 and/or a high-speed cache memory 32. The computer device 12 may further include other removable or non-removable, volatile or non-volatile computer system storage medium. By way of example only, the storage system 34 may be configured to read and write non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media can be provided. In these cases, each driver may be connected to the bus 18 via one or more data medium interfaces. The memory 28 may include at least one program product. The program product has a set of (such as, at least one) program modules configured to perform the functions of various embodiments of the present disclosure.

A program/utility 40 having a set of (at least one) the program modules 42 may be stored in, for example, the memory 28. The program modules 42 include but are not limited to, an operating system, one or more application programs, other programs modules and program data. Each of these examples, or some combination thereof, may include an implementation of a network environment. The program modules 42 generally configured to perform functions and/or methods in embodiments of the present disclosure.

The computer device 12 may also communicate with one or more external devices 14 (such as, a keyboard, a pointing device, a display 24, etc.). Furthermore, the computer device 12 may also communicate with one or more devices enabling a user to interact with the computer device 12 and/or other devices (such as a network card, a modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as the Internet) through a network adapter 20. As shown in FIG. 9, the network adapter 20 communicates with other modules of the computer device 12 over the bus 18. It should be understood that, although not shown in FIG. 9, other hardware and/or software modules may be used in conjunction with the computer device 12, which include, but are not limited to, microcode, device drivers, redundant processing units, external disk drive arrays, RAID systems, tape drives, as well as data backup storage systems and the like.

The processing unit 16 is configured to execute various functional applications and data processing by running programs stored in the system memory 28, for example, to implement the method provided in embodiments of the present disclosure.

In addition, terms such as "first" and "second" are used herein for purposes of description and are not intended to indicate or imply relative importance or significance. Furthermore, the feature defined with "first" and "second" may include one or more this feature distinctly or implicitly. In the description of the present disclosure, "a plurality of" means two or more than two, such as two, or three unless specified otherwise.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been shown and described, it would be appreciated by those skilled in the art that the above embodiments cannot be construed to limit the present disclosure, and changes, alternatives, and modifications can be made.

What is claimed is:

1. A translation processing method, comprising:
   obtaining a first speech signal of a first language;
   performing Mel-frequency cepstrum analysis on the first speech signal to generate a speech feature vector in a first dimension;
   transforming by a feed forward neural network, the speech feature vector in the first dimension to a speech feature vector in a second dimension that matches an input information dimension of a pre-trained end-to-end translation model;
   inputting the speech feature vector in the second dimension into the pre-trained end-to-end translation model for conversion from a first language speech to a second language text, to obtain text information of a second language corresponding to the first speech signal; and
   performing speech synthesis on the text information of the second language to obtain a second speech signal, and playing the second speech signal;
   wherein a training corpus of the pre-trained end-to-end translation model includes:
   a speech corpus of the first language and a text corpus of the second language corresponding to the speech corpus of the first language, in which the text corpus of the second language is translated by a translation engine from a text corpus of the first language, and the text corpus of the first language is obtained by a speech recognition system recognizing the speech corpus of the first language; or
   annotated speech corpus of the first language and annotated text corpus of the second language corresponding to the annotated speech corpus of the first language, in which the annotated text corpus of the second language is translated by a translation engine from annotated text corpus of the first language, and the annotated text corpus of the first language is obtained by a speech recognition system recognizing the annotated speech corpus of the first language.

2. The translation processing method according to claim 1, wherein before inputting the speech feature vector into the pre-trained end-to-end translation model, the method further comprises:
   obtaining a speech corpus of the first language and a corresponding text corpus of the second language as a translation training corpus; and
   training a processing parameter of a preset model based on the translation training corpus, to generate the end-to-end translation model.

3. The translation processing method according to claim 2, wherein when the first language and the second language are minority languages, obtaining the speech corpus of the first language and the corresponding text corpus of the second language as the translation training corpus comprises:
   performing a recognition process on the speech corpus of the first language by a speech recognition system, to obtain a text corpus of the first language; and
   translating the text corpus of the first language into the text corpus of the second language by a translation engine.

4. The translation processing method according to claim 2, wherein obtaining the speech corpus of the first language and the corresponding text corpus of the second language as the translation training corpus comprises:
   obtaining annotated text corpus of the first language corresponding to the speech corpus of the first language; and
   translating the text corpus of the first language into the text corpus of the second language by a translation engine.

5. A translation processing device, comprising:
   a processor;
   a memory; and
   wherein the processor is configured to run a program corresponding to executable program codes by reading the executable program codes stored in the memory, to:
   obtain a first speech signal of a first language;
   perform Mel-frequency cepstrum analysis on the first speech signal to generate a speech feature vector in a first dimension;
   transform by a feed forward neural network, the speech feature vector in the first dimension to a speech feature vector in a second dimension that matches an input information dimension of a pre-trained end-to-end translation model;
   input the speech feature vector in the second dimension into the pre-trained end-to-end translation model for conversion from a first language speech to a second language text to obtain text information of a second language corresponding to the first speech signal; and
   perform speech synthesis on the text information of the second language to obtain a second speech signal, and play the second speech signal;

wherein a training corpus of the pre-trained end-to-end translation model includes:

a speech corpus of the first language and a text corpus of the second language corresponding to the speech corpus of the first language, in which the text corpus of the second language is translated by a translation engine from a text corpus of the first language, and the text corpus of the first language is obtained by a speech recognition system recognizing the speech corpus of the first language; or annotated speech corpus of the first language and annotated text corpus of the second language corresponding to the annotated speech corpus of the first language, in which the annotated text corpus of the second language is translated by a translation engine from annotated text corpus of the first language, and the annotated text corpus of the first language is obtained by a speech recognition system recognizing the annotated speech corpus of the first language.

6. The translation processing device according to claim 5, wherein the processor is further configured to:

obtain a speech corpus of the first language and a corresponding text corpus of the second language as a translation training corpus; and train a processing parameter of a preset model based on the translation training corpus to generate the end-to-end translation model.

7. The translation processing device according to claim 6, wherein when the first language and the second language are minority languages, the processor is configured to:

perform a recognition process on the speech corpus of the first language by a speech recognition system to obtain a text corpus of the first language; and translate the text corpus of the first language into the text corpus of the second language by a translation engine.

8. The translation processing device according to claim 6, wherein in obtaining the speech corpus of the first language and the corresponding text corpus of the second language as the translation training corpus, the processor is further configured to:

obtain annotated text corpus of the first language corresponding to the speech corpus of the first language; and translate the text corpus of the first language into the text corpus of the second language by a translation engine.

9. A non-transitory computer readable storage medium having stored thereon a computer program that, when executed by a processor, causes a translation processing method to be implemented, the method comprising:

obtaining a first speech signal of a first language;

performing Mel-frequency cepstrum analysis on the first speech signal to generate a speech feature vector in a first dimension;

transforming by a feed forward neural network, the speech feature vector in the first dimension to a speech feature vector in a second dimension that matches an input information dimension of a pre-trained end-to-end translation model;

inputting the speech feature vector in the second dimension into the pre-trained end-to-end translation model for conversion from a first language speech to a second language text, to obtain text information of a second language corresponding to the first speech signal; and performing speech synthesis on the text information of the second language to obtain a second speech signal, and playing the second speech signal;

wherein a training corpus of the pre-trained end-to-end translation model includes:

a speech corpus of the first language and a text corpus of the second language corresponding to the speech corpus of the first language, in which the text corpus of the second language is translated by a translation engine from a text corpus of the first language, and the text corpus of the first language is obtained by a speech recognition system recognizing the speech corpus of the first language; or annotated speech corpus of the first language and annotated text corpus of the second language corresponding to the annotated speech corpus of the first language, in which the annotated text corpus of the second language is translated by a translation engine from annotated text corpus of the first language, and the annotated text corpus of the first language is obtained by a speech recognition system recognizing the annotated speech corpus of the first language.

10. The non-transitory computer readable storage medium according to claim 9, wherein before inputting the speech feature vector into the pre-trained end-to-end translation model, the method further comprises:

obtaining a speech corpus of the first language and a corresponding text corpus of the second language as a translation training corpus; and training a processing parameter of a preset model based on the translation training corpus, to generate the end-to-end translation model.

11. The non-transitory computer readable storage medium according to claim 10, wherein when the first language and the second language are minority languages, obtaining the speech corpus of the first language and the corresponding text corpus of the second language as the translation training corpus comprises:

performing a recognition process on the speech corpus of the first language by a speech recognition system, to obtain a text corpus of the first language; and translating the text corpus of the first language into the text corpus of the second language by a translation engine.

12. The non-transitory computer readable storage medium according to claim 10, wherein obtaining the speech corpus of the first language and the corresponding text corpus of the second language as the translation training corpus comprises:

obtaining annotated text corpus of the first language corresponding to the speech corpus of the first language; and translating the text corpus of the first language into the text corpus of the second language by a translation engine.

* * * * *